(12) United States Patent
Xu et al.

(10) Patent No.: US 12,407,577 B2
(45) Date of Patent: Sep. 2, 2025

(54) GRAPH NEURAL NETWORK BASED CLOUD TRAFFIC PREDICTION AND OPTIMIZATION

(71) Applicant: SAP SE, Walldorf (DE)

(72) Inventors: Lei Xu, Shanghai (CN); Deng Feng Wan, Shanghai (CN)

(73) Assignee: SAP SE, Walldorf (DE)

( * ) Notice: Subject to any disclaimer, the term of this patent is extended or adjusted under 35 U.S.C. 154(b) by 785 days.

(21) Appl. No.: 17/741,795

(22) Filed: May 11, 2022

(65) Prior Publication Data
US 2023/0370337 A1    Nov. 16, 2023

(51) Int. Cl.
*H04L 41/147* (2022.01)
*G06N 3/044* (2023.01)
*G06N 3/08* (2023.01)
*H04L 67/02* (2022.01)

(52) U.S. Cl.
CPC ........... *H04L 41/147* (2013.01); *G06N 3/044* (2023.01); *G06N 3/08* (2013.01); *H04L 67/02* (2013.01)

(58) Field of Classification Search
CPC ....... H04L 41/147; H04L 67/02; G06N 3/044; G06N 3/08
See application file for complete search history.

(56) References Cited

U.S. PATENT DOCUMENTS

| | | | |
|---|---|---|---|
| 11,075,823 B1* | 7/2021 | Jaiswal | H04L 41/5054 |
| 2006/0184829 A1* | 8/2006 | Cheong | G06F 11/3604 |
| | | | 714/39 |
| 2011/0125892 A1* | 5/2011 | Rajan | H04L 43/10 |
| | | | 709/224 |
| 2012/0159250 A1* | 6/2012 | Aull | G06F 11/3672 |
| | | | 714/E11.02 |
| 2021/0243208 A1* | 8/2021 | Rubin | G06F 21/552 |
| 2021/0374118 A1* | 12/2021 | Kim | G06F 16/278 |
| 2023/0198949 A1* | 6/2023 | Zhou | H04L 63/20 |
| | | | 726/11 |
| 2023/0289444 A1* | 9/2023 | Ermey | G06F 21/552 |
| 2023/0370337 A1* | 11/2023 | Xu | H04L 41/0896 |

\* cited by examiner

*Primary Examiner* — David E Choi
(74) *Attorney, Agent, or Firm* — Buckley, Maschoff & Talwalkar LLC

(57) ABSTRACT

Some embodiments may be associated with a cloud computing environment. A computer processor of a traffic prediction server may retrieve performance stack trace logs from a traffic performance stack trace log repository that stores traffic information of the cloud computing environment. The traffic prediction server parses the performance stack trace logs as an objects list including parent/child object relationships and stores the parsed objects list in a graph database. The traffic prediction server may then transform the graph database into training data including spatial and temporal information and use the transformed training data to train a transformer model. According to some embodiments, the traffic prediction server also provides previous traffic input data to the transformer model when generates predicted traffic output data based on the previous traffic input data (e.g., to facilitate cloud load management).

21 Claims, 19 Drawing Sheets

```
400 ─┐
     ↘
  {
    "name": "request1",
    "invokeCount": 1,
    "timeCost": 31,
    "sub": [
      {
        "name": "method1",        ⎤
        "invokeCount": 1,         ⎥ ─ 410
        "timeCost": 20,           ⎥
        "sub": [                  ⎦
          {
            "name": "method11",   ⎤
            "invokeCount": 1,     ⎬ ─ 420
            "timeCost": 13        ⎦
          },
          {
            "name": "method12",   ⎤
            "invokeCount": 2,     ⎬ ─ 430
            "timeCost": 13        ⎦
          }
        ]
      }
    ]
  }
```

| Time Period (T) | Edge | Data |
|---|---|---|
| 11:00-11:30 | 1-2 | 40 |
| 11:00-11:30 | 1-3 | 20 |
| 11:00-11:30 | 2-9 | 30 |
| . . . . . | | 920 |
| 11:30-12:00 | 1-2 | 30 |
| 11:30-12:00 | 1-3 | 22 |
| 11:30-12:00 | 2-9 | 25 |
| . . . . . | | |

*FIG. 9*

| Time Period (T) | Edge 1-2 | Edge 1-3 | Edge 2-9 |
|---|---|---|---|
| 11:00-11:30 | 40 | 20 | 30 |
| 11:30-12:00 | 30 | 22 | 25 |
| 12:00-12:00 | 23 | 23 | 34 |
| ... | | ... | |

FIG. 10

GRAPH NEURAL NETWORK BASED CLOUD TRAFFIC PREDICTION AND OPTIMIZATION

BACKGROUND

An enterprise may use applications to perform business functions. For example, cloud-based applications are increasingly used to process purchase orders, handle human resources tasks, interact with customers, etc. As a result, there is a substantial resources demand on cloud providers from customers, and cloud performance is an especially important challenge for providers who want to improve the customer experience. To improve performance, a cloud provider needs to better predict future cloud traffic so that system resource utilization can be optimized. Note that cloud applications generate a substantial amount of performance trace logs for HyperText Transfer Protocol ("HTTP") requests. These trace logs include not only the general HTTP request information (such as the Uniform Resource Locator ("URL"), a time cost indicating an amount of time associated to process the request, a computation or Central Processing Unit ("CPU") resources amount that indicates an amount of CPU processing required to respond to the request, a memory resources amount reflecting an amount of storage need to respond to the request, etc.), but also the server performance stack trace—such as nested Application Programming Interface ("API") calls along with each API call's invocation count and duration. How to store the trace logs and utilize them to predict future API traffic is a difficult problem, especially considering the API dependency and calling graph. For example, nested API calls are tree-like, semi-structured data that is not easily stored in a relational database. If it is stored as plain text, it is hard to parse to generate an intelligent prediction. Therefore, for cloud applications, it is difficult to leverage the performance trace logs to predict future API traffic (which would help with cloud resources planning and balancing). If a cloud provider could predict trends in cloud usage, it can add or remove resources such as servers, virtual machines, database storage, etc. to better match actual future usage. This altering of the amount or number of computing resources might, for example, be performed manually or automatically when certain thresholds are met.

It would be desirable to perform traffic prediction for a cloud computing environment in a secure, efficient, and accurate manner.

SUMMARY

Methods and systems may be associated with a cloud computing environment. A computer processor of a traffic prediction server may retrieve performance stack trace logs from a traffic performance stack trace log repository that stores traffic information of the cloud computing environment. The traffic prediction server parses the performance stack trace logs as an objects list including parent/child object relationships and stores the parsed objects list in a graph database. The traffic prediction server may then transform the graph database into training data including spatial and temporal information and use the transformed training data to train a transformer model. According to some embodiments, the traffic prediction server also provides previous traffic input data to the transformer model when generates predicted traffic output data based on the previous traffic input data (e.g., to facilitate cloud load management).

Some embodiments comprise: means for retrieving, by a computer processor of a traffic prediction server, performance stack trace logs from a traffic performance stack trace log repository that stores traffic information of the cloud computing environment; means for parsing the performance stack trace logs as an objects list including parent/child object relationships; means for storing the parsed objects list in a graph database; means for transforming the graph database into training data including spatial and temporal information; and use the transformed training data to train a transformer model; and means for using the transformed training data to train a transformer model. Some embodiments further comprise means for providing previous traffic input data to the transformer model, wherein the transformer model generates predicted traffic output data based on the previous traffic input data.

Some technical advantages of some embodiments disclosed herein are improved systems and methods to perform traffic prediction for a cloud computing environment in a secure, efficient, and accurate manner.

BRIEF DESCRIPTION OF THE DRAWINGS

FIG. 4 is an example of a JSON file containing raw stack trace data according to some embodiments.

FIG. 9 illustrates a training data table in accordance with some embodiments.

FIG. 10 illustrates a pivot transformation according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will now be described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
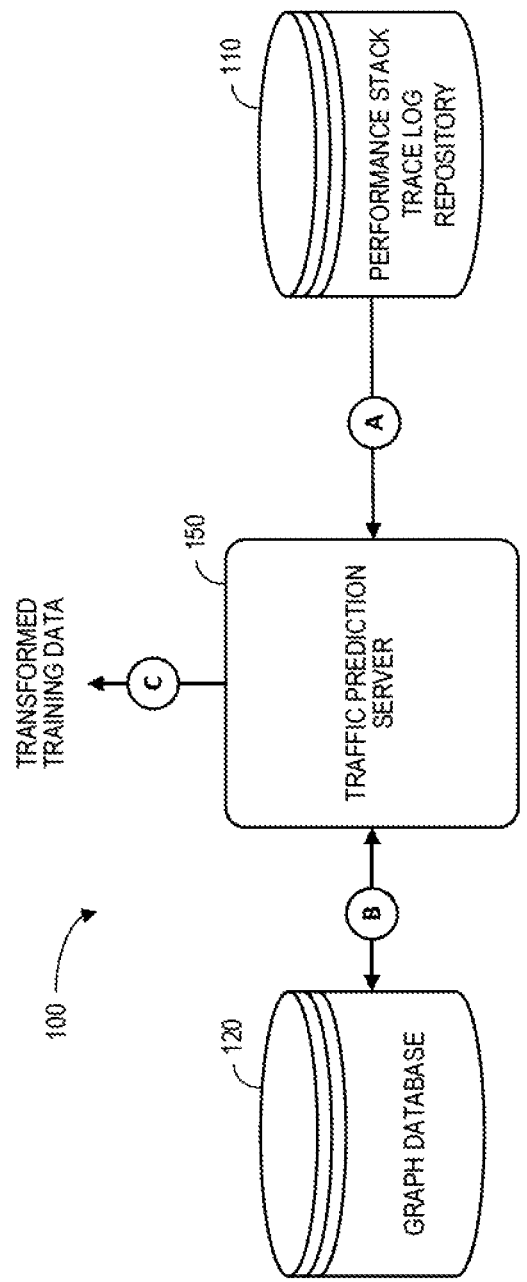
FIG. 1 is a high-level architecture for a system in accordance with some embodiments.

FIG. 1 is a high-level block diagram of a system 100 according to some embodiments. At (A), a traffic prediction server 150 receives data associated with the execution of applications in a cloud computing environment from a performance stack trace log repository 110. The traffic prediction server 150 may then parse performance stack trace log files (that include nested API calls) as an objects list including parent/child relationships. The parsed objects may be stored into a graph database 120 at (B). As used herein, the phrase "graph database" may refer to a database that uses graph structures for semantic queries with nodes, edges, and properties to represent and store data. The graph (also known as the "edge" or "relationship") relates the data items in the store to a collection of nodes and edges (with the edges representing relationships between the nodes). The information in the graph database 120 can then be automatically transformed by the traffic prediction server 150 to be used as training data at (C). A used herein, the term "automatically" may refer to a device or process that can operate with little or no human interaction.

According to some embodiments, devices, including those associated with the system 100 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores (e.g., the performance stack trace log repository 110 and the graph database 120), which may be locally stored or reside remote from the traffic prediction server 150. Although a single traffic prediction server 150 is shown in FIG. 1, any number of such devices may be included. Moreover, various devices described herein might be combined according to embodiments of the present invention. For example, in some embodiments, the traffic prediction server 150 and the performance stack trace log repository 110 might comprise a single apparatus. Some or all of the system 100 functions may be performed by a constellation of networked apparatuses, such as in a distributed processing or cloud-based architecture.

An operator (e.g., a database administrator) may access the system 100 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various mapping relationships) and/or provide or receive automatically generated recommendations, results, and/or alerts from the system 100. According to some embodiments, the operator may generate instructions to adjust cloud resources (e.g., a number of assigned servers) or set thresholds that, when triggered, may manually or automatically result in an adjustment of cloud resources.

Figure 2:
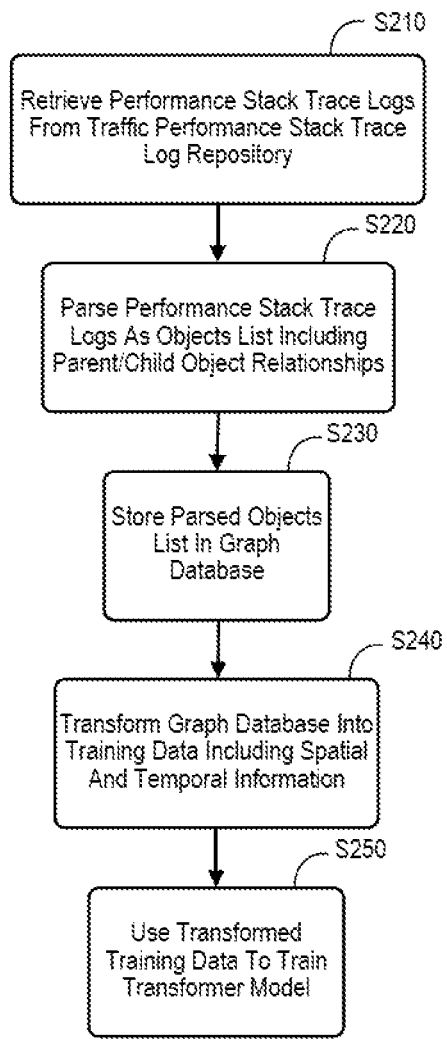
FIG. 2 illustrates a method according to some embodiments.

FIG. 2 illustrates a method to perform traffic prediction for a cloud computing environment in a secure, efficient, and accurate manner according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a computer processor of a traffic prediction server may retrieve performance stack trace logs from a traffic performance stack trace log repository that stores traffic information of the cloud computing environment. At S220, the system may parse the performance stack trace logs as an objects list (including parent/child object relationships) which are then stored in a graph database at S230. At S240, information in the graph database is transformed into training data (including spatial and temporal information). At S250, the transformed training data used to train a transformer model. Previous traffic input data associated with the cloud computing environment can then be provided to the transformer model, and the transformer model can generate predicted traffic output data (e.g., future traffic) based on the previous traffic input data.

Figure 3:
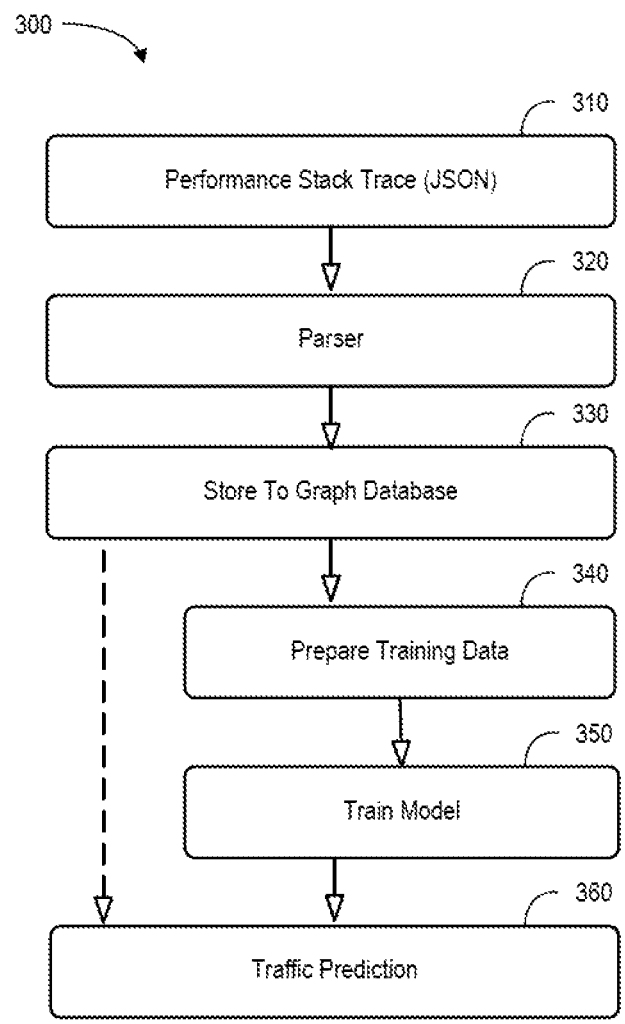
FIG. 3 is an overall process flow in accordance with some embodiments.

FIG. 3 is an overall process flow 300 in accordance with some embodiments. Substantial amounts of performance stack trace 310, which may be in JavaScript Object Notation ("JSON") format, are collected from cloud applications. Going through a log parser 320, the JSON format stack trace is parsed as an objects list in a python program, and the parent/child relationship are realized via a special field in the object. The parsed objects can then be stored in graph database 330 (e.g., SAP® HANA Graph, Neo4j, etc.) using the graph structure. To prepare the training data 340, the data is queried and retrieved from the graph database 330 and is then prepared 340 by transforming it into a training ready data format. This includes graph spatial information (e.g., an adjacency matrix) and the temporal information (which includes each edge's invoke times sum during a specific time period). With a transformer model enhanced by at least one Graph Attention Network ("GAT"), the system can train the model 350 (which may be in binary format and stored in a central repository). To perform traffic prediction 360, input data may be queried and retrieved from the graph database 330, and the trained model 350 will be able to predict the next few hours of traffic based on the last few hours traffic (and be able to fully consider the graph structure and dependencies). For example, in an enterprise cloud environment network traffic might normally increase from 9:00 AM through 5:00 PM and then decrease after 5:00 PM. In this case, an unusually heavy amount of traffic right before 5:00 PM might indicate that traffic after 5:00 PM will decrease less than usual (depending, of course, on what the model has learned based on past behavior of the enterprise cloud environment). This may directly benefit cloud load management, because the provider can better balance loads among different methods (e.g., associated with databases, servers, etc.) and give feedback to a corresponding engineering team maintaining the application code to optimize potential heavy call loads.

FIG. 4 is an example of a JSON file 400 containing raw stack trace data according to some embodiments. Each JSON file 400 represents one HTTP request, and it records each method—and all of its nested methods—name, invocation count (e.g., "invoke Count" and time cost (e.g., "timeCost" in milliseconds) for the method. The "sub" tag means that there are nested sub methods inside of this method call. The file 400 of FIG. 4 is associated with a request named "request1" having an invokeCount of "1" and a timeCost of "31." Moreover, the file 400 includes nested methods, namely "method11" 420 and "method12" 430 which are children of parent "method1" 410. Note that each method is associated with its own invokeCount and a timeCost.

Figure 5:
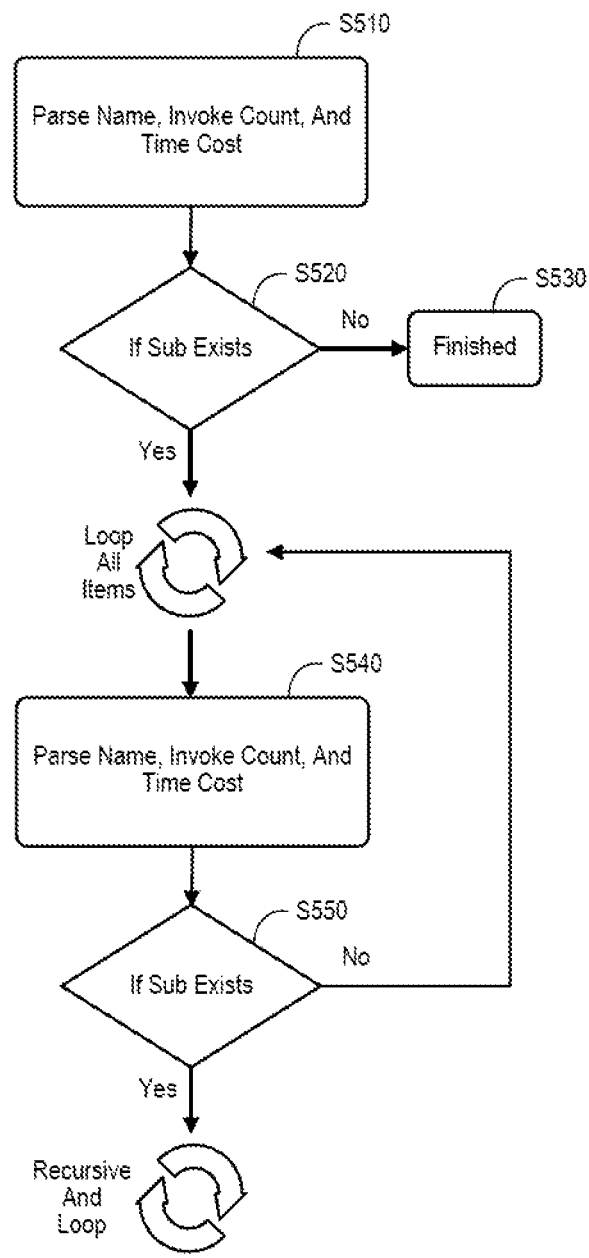
FIG. 5 is a parsing method in accordance with some embodiments.

FIG. 5 is a method that may be used to parse the file 400 in accordance with some embodiments. For example, the method may parse the JSON file 400 to get the HTTP request name, invoke count, and time cost for that request (which are all from the root attributes) at S510. At S520, the system may check to see whether a sub exists (e.g., a nested sub-method). If not, the method is already finished at S530. If a sub exists at S520, the system loops all sub items. For each sub item, the system parses the method name, invoke count, and time cost for the item at S540. For this sub item, if there are still sub items inside at S550, the system recursively parses the sub items until all sub items have been processed. This continues until all sub items have been processed (and the next item is then processed until all items are finished). All of the parsed objects may be stored as a list, and each object contains JSON parsed attributes (e.g., name, invoke count, and time cost). The system also keeps the parent/child relationship (by a unique identifier for each object) which is then used for graph storage.

Figure 6:
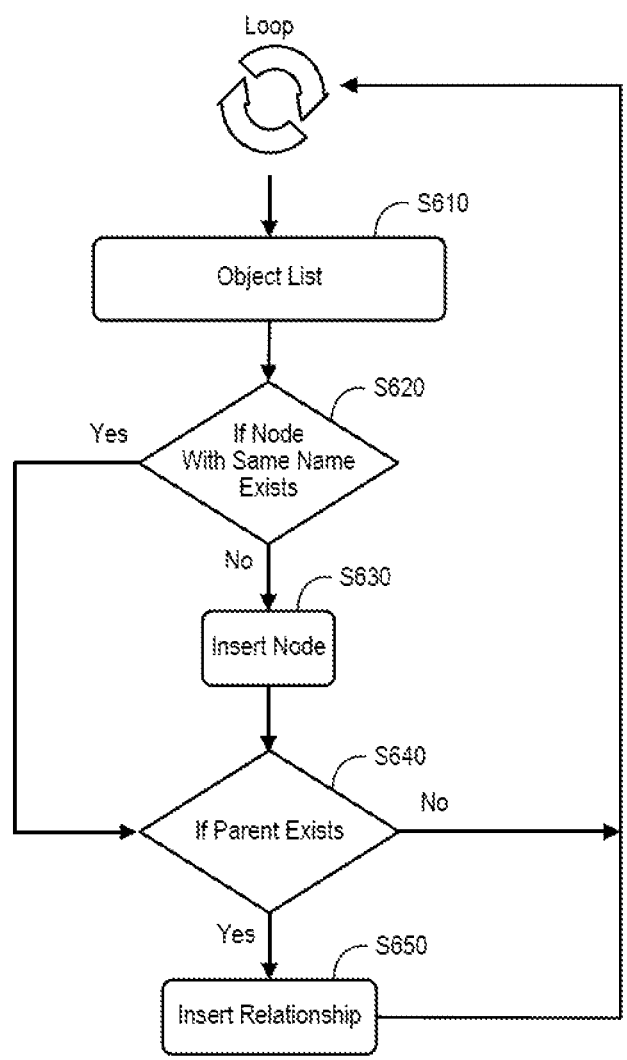
FIG. 6 is a graph storage method according to some embodiments.

The system may store the parsed performance stack trace log objects to a graph database for better analysis and further query and/or retrieval. FIG. 6 is a graph storage method according to some embodiments. Initially, the system loops the parsed object list from JSON at S610 by first getting the associated name (e.g., HTTP request name or method name). If no node with that same name already exists at S620, the new name is inserted at S630. If there is already a node with that name at S620, the system checks from the object if there is parent required (a parent/child relationship). If parent does not exist at S640, the system loops to the next object. If a parent does exist at S640, the system builds a graph relationship at S650. This would involve creating a graph edge (or relationship) having invoke count and time cost attributes. After the relationship built at S650, the system loops to the next object and proceeds.

Figure 7:
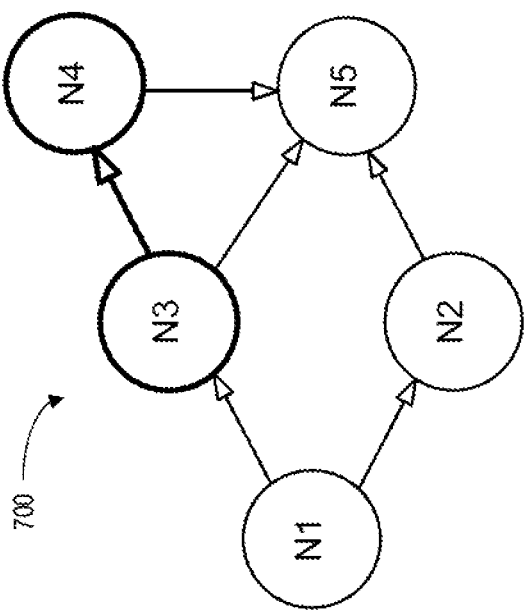
FIG. 7 illustrates graph spatial attributes and an adjacency matrix in accordance with some embodiments.

Graph spatial attributes may then need to be prepared to reflect the topological properties of the HTTP request. FIG. 7 illustrates graph spatial attributes 700 and an adjacency matrix 710 in accordance with some embodiments. The graph spatial attributes 700 include a number of nodes (N1 through N5) with directed edges between them (e.g., nodes N2 and N3 are children of node N1). The adjacency matrix 710 is a square matrix that is used to represent the graph spatial attributes 700. The elements of the matrix 710 indicate whether pairs of vertices are adjacent or not in the graph 700. As this example shows, there are 5 vertices numbered N1 through N5, so each element with a value of "1" will represent that there is an edge from one node to another node. If the element value is "0," that means no directional edge to connect the two nodes exists in that direction. For example, as illustrated by the bold arrow in the graph 700 from N3 to N4, the matrix 710 includes a "1" "From N3"-"To N4" indicating that relationship (note that "From N4"-"To N3" has a "0" because no relationship exists in that direction).

According to some embodiments, the adjacency matrix 710 is generated by selecting a first node. The system may then determine if a second node has a child relationship to the first node. If the second node has a child relationship to the first node, then the system may store a first value (e.g., a "1") in a corresponding location in the adjacency matrix 710. If the second node does not have a child relationship to the first node, the system may instead store a second value (e.g., a "0") in the corresponding location in the adjacency matrix 710.

Figure 8:
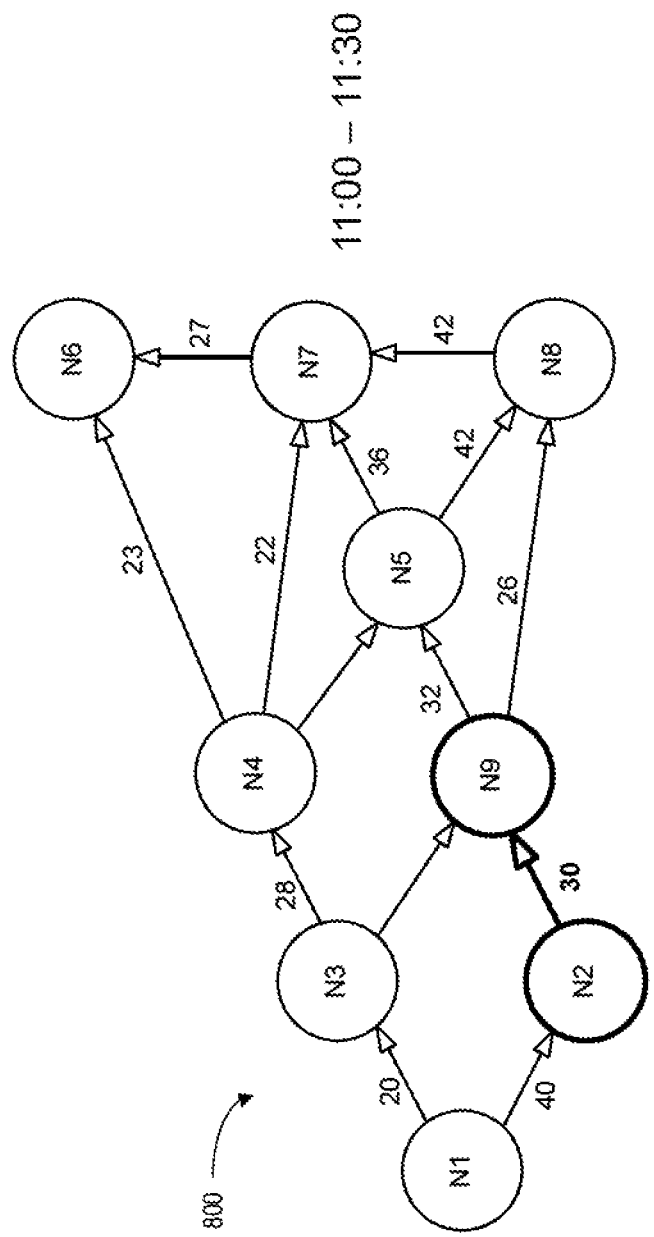
FIG. 8 illustrates a training data graph according to some embodiments.

In addition to the existence of spatial relationships between the nodes, note that each relationship may be associated with attributes (e.g., a time cost). For example, FIG. 8 illustrates a training data graph 800 at time "11:00-11:30" according to some embodiments. Here nodes N1 through N9 have relationships labeled with a time cost value (e.g., in milliseconds). As shown by the bold arrow in FIG. 8, the relationship from node N2 to node N9 is associated with a time cost of "30." In this way, the training data may capture the temporal information of the graph 800. For two nodes (or vertices), the graph 800 may capture all time related traffic (invoke count from one node to another node) which can be aggregated by time period (e.g., a 30 minute invoke count sum between two nodes). Therefore, there will be raw data ready in the graph 800 and each edge will have different weights at different time periods. Note that the illustration of FIG. 8 has a graph 800 that only shows weights within one time period. Although a 30 minute time period is used to illustrate some embodiments herein, note that time periods of any other duration might used instead.

Figure 10:
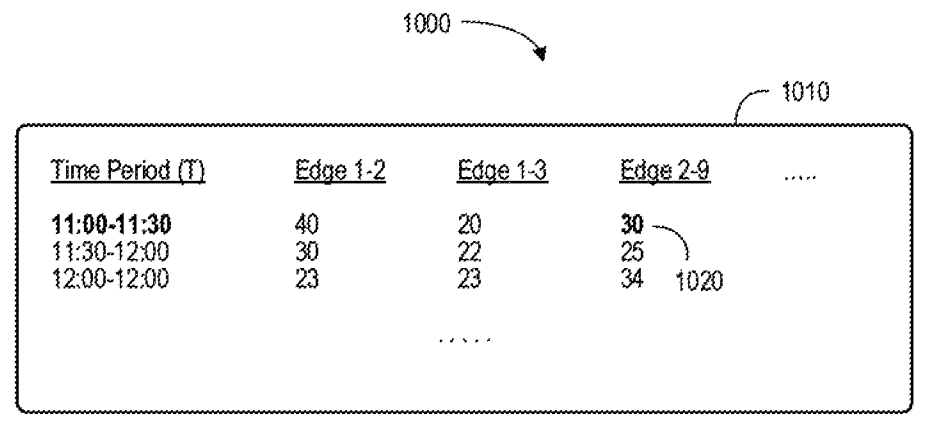

The raw data may be depicted in a table that has the format: time period (T), edge, data (which is the invoke count between the two nodes). For example, FIG. 9 illustrates 900 a training data table 910 in accordance with some embodiments. As illustrated by the bold entry 920 in the table 910, at time (T) "11:00-11:30" that data for edge "2-9" (that is, from node N2 to node N9 in the graph 800 of FIG. 8) is "30." After a pivot to another direction, the system may show different time periods, and different edges may show different weights. For example, FIG. 10 illustrates 1000 a pivot transformation according to some embodiments. Here, a table 1010 has the format: time period, each edge pair. As illustrated by the bold entry 1020 in the table, for time period (T) "11:00-11:30," the value for edge "2-9" is "30" (matching the graph of FIG. 8 and the table 910 of FIG. 9).

Figure 11:
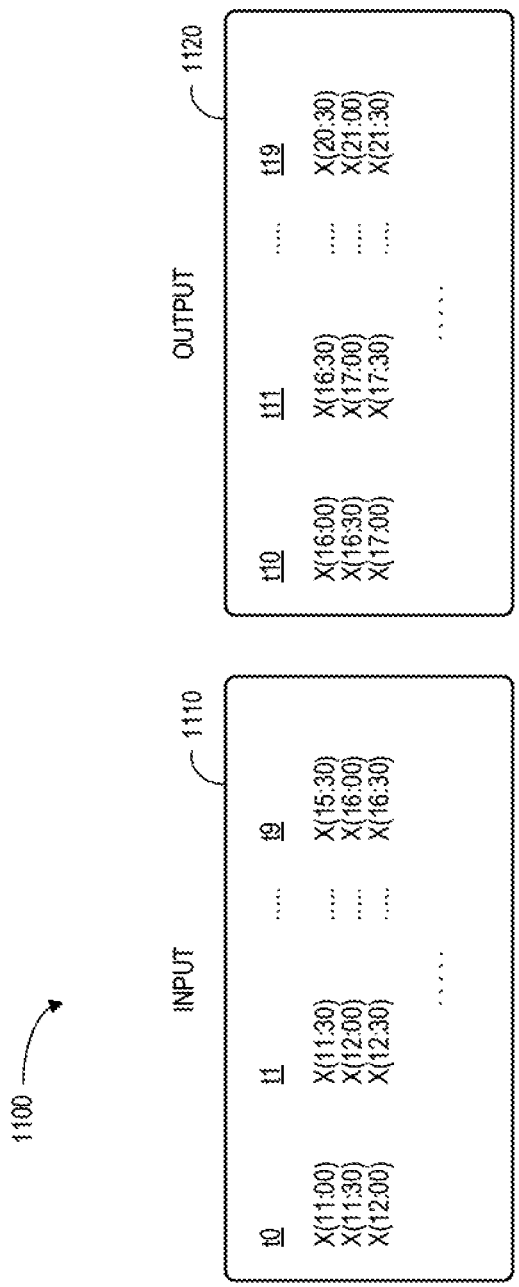
FIG. 11 is training data input and output tables in accordance with some embodiments.

For deep learning training purposes, the system may convert this to training data (input) and model (output) label formats. For example, FIG. 11 is training data 1100 input 1110 and output 1120 tables in accordance with some embodiments. Here, X(t) indicates a vector which is composed of all edge's data during that t period, such as:

$$X(t)=[\text{edge}(1\text{-}2),\text{edge}(1\text{-}3),\ldots]$$

The data may be changed to time-shift format, and the input will be from t0 to t9 while the output is from t10 to t19. At each time point, the input 1110 and output 1120 contain an X vector composed of all of the edge data during that time period.

Figure 12:
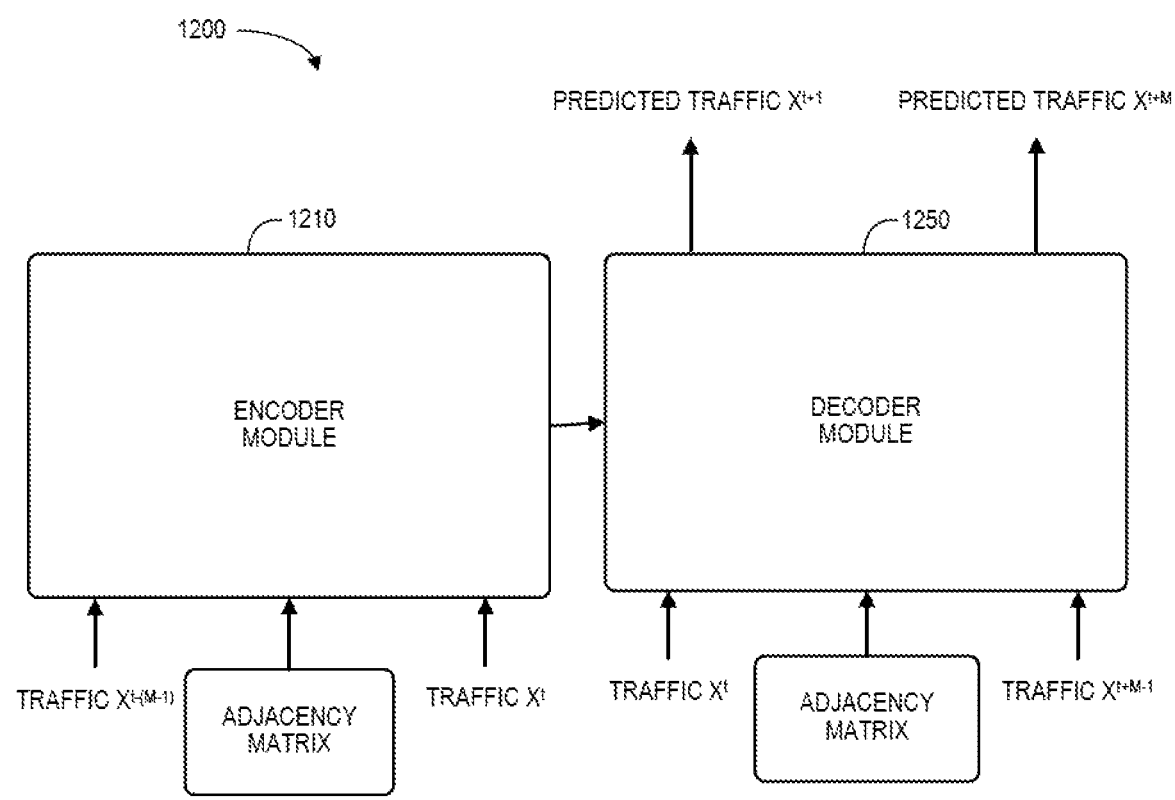
FIG. 12 is an encoder-decoder model architecture according to some embodiments.

The training data 1100 essentially represents a kind of time series prediction where an initial set of elements in a series is provided and used by the system to predict the next few elements. Note that the input 1110 is not merely time intervals, it comprises vector combinations of a series of time intervals (with each vector representing the state of each individual time interval's traffic graph state). The output is 1120 is also vector combinations of a series of time intervals (for future time periods). The system constructs time-shift based vectors to predict future time period vectors from previous time period vectors FIG. 12 is an encoder-decoder model 1200 architecture according to some embodiments. To train and predict the next period's graph traffic, temporal information may be encoded so that both the continuity and periodicity of traffic data can be preserved, and the transformer may be extended to modelling temporal and spatial dependencies jointly with the help of at least one GAT. In particular, an encoder-decoder architecture (that is, encoder module 1210 and decoder module 1250) can coherently model spatial and temporal dependencies of traffic data in an end-to-end training manner.

Figure 13:
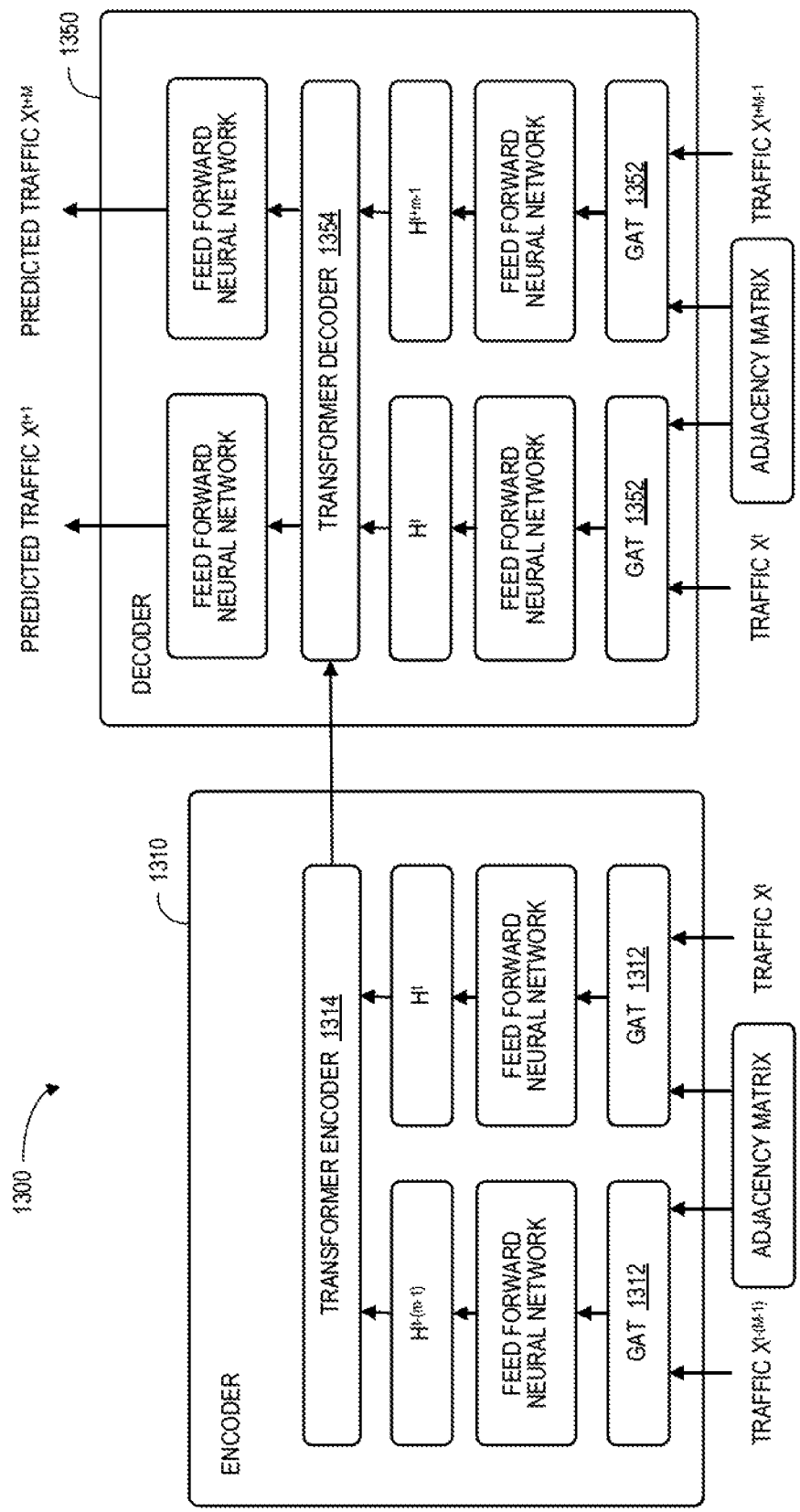
FIG. 13 is a more detailed model in accordance with some embodiments.

For the encoder-decoder model 1200, the encoder module 1210 provides an output to the decoder module 1250 (depicted in more detail in FIG. 13 according to some embodiments). In particular, the decoder module 1250 take the encoder module 1210 output as one input. Traffic $X^t$ means the vector which represent the traffic amount during t time interval (that is X(t) of FIG. 11). The time series prediction uses the input from previous time periods (which was composed by each time interval) and predicts future time periods (which is composed by next time period's time interval). In the encoder-decoder model 1200, the input traffic from $X^{t-(M-1)}$ to $X^t$ is the input time period's each time interval's traffic vector, and output traffic from $X^{t+1}$ to $X^{t+M}$ is output time period's each interval's traffic vector. During a training phase, the system uses predicted traffic $X^t$ to $X^{t+M-1}$ as the decoder module 1250 input as well. The time data (which is actually time-based traffic data) generated from FIGS. 8 through 11 was used as input/output (during the training phase) in FIGS. 12 and 13, and these can be matched by time interval (e.g., traffic $X^t$ matches t in FIG. 11).

The aim of graph traffic forecasting is to predict future traffic from a graph, given a sequence of historical traffic observations (e.g., invoke counts) that are detected by performance stack traces on a method calling a graph network. For example, FIG. 13 is a more detailed model 1300 in accordance with some embodiments. The architecture conforms to an end-to-end sequence framework, composed of an encoder 1310 and a decoder 1320. In the encoder 1310, a sequence of traffic is input a GAT layer 1312 together with a graph adjacency matrix which includes spatial data of the graph. Then, a fully connected neural network is employed to strengthen the expressiveness of the model 1300. These features are then fed from a transformer encoder 1314 in the encoder to a transformer decoder 1354 cell in the decoder 1350 to learn temporal features.

The decoder 1350 a similar structure. During the training process, a sequence of traffic is fed into the decoder 1350 through the same series of neural networks as the input for the encoder 1310, and the graph adjacency matrix is fed into a GAT layer 1352. Then, a feed forward neural network is used, and the output is fed into the transformer decoder 1354 (and the model 1300 eventually gets the prediction result of the traffic sequence).

Thus, the transformer model 1300 is organized in an encoder-decoder fashion, in which identical encoder 1310 modules are stacked at the bottom of stacked decoder 1350 modules. Each encoder 1310 module is composed of a multi-head self-attention layer and a position-wise feedforward layer, while each decoder 1350 module has one additional layer (i.e., an encoder-decoder attention layer) which is inserted between the self-attention and feed forward layers to bridge the encoder 1310 and decoder 1350 portions.

The GAT 1312, 1352 can operate on graph-structured data, leveraging masked self-attentional layers. The GAT 1312, 1352 can obtain sufficient expressive power to transform the input features into higher-level features. During the training phase, the aim of the transformer model 1300 is to minimize the difference between the real and predicted traffic at each future time-step as measured by the Mean Absolute Error ("MAE"). The loss function of traffic transformer model 1300 can be formulated as:

$$\text{Loss} = \frac{1}{H}\sum_{t=1}^{H}\frac{1}{N}\sum_{j=1}^{N}\left|X_j^t - \hat{X}_j^t\right|$$

where $X_j^t$ is predicted traffic at edge j during time t, and $\hat{X}_j^t$ is a corresponding ground truth.

For example, the system might save all log traces from the last month (or even the last three months). The system may then convert these to a time series data format input/output and train a transformer model which is used for time series prediction. The system can then input the last twelve hours of traffic data (converted from log traces) and the adjacency matrix along with the prediction model. The output may then represent the next twelve hours of traffic data (with each vector representing a traffic amount between different edges—which are actually methods).

Figure 14:
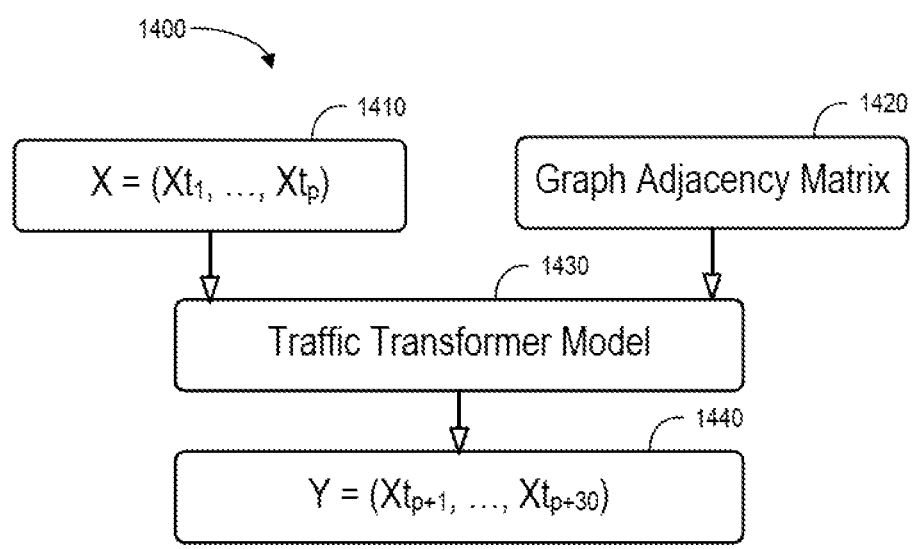
FIG. 14 is a model training process according to some embodiments.

FIG. 14 is a model training process 1400 according to some embodiments. The process 1400 includes feeding the X input vectors 1410 and the graph adjacency matrix 1420 (the training data) into the traffic transformer model 1430. The traffic transformer model 1430 generates Y output vector 1440 predictions. During training time, the training data may be fed into the traffic transformer in batches together with graph adjacent matrix 1420 which should include the spatial information. After a few epochs of running, the loss will become smaller and smaller as the model 1430 converges. Eventually, the process 1400 will achieve a stable model (saved as binary file) that can be used for traffic prediction in a cloud computing environment.

Figure 15:
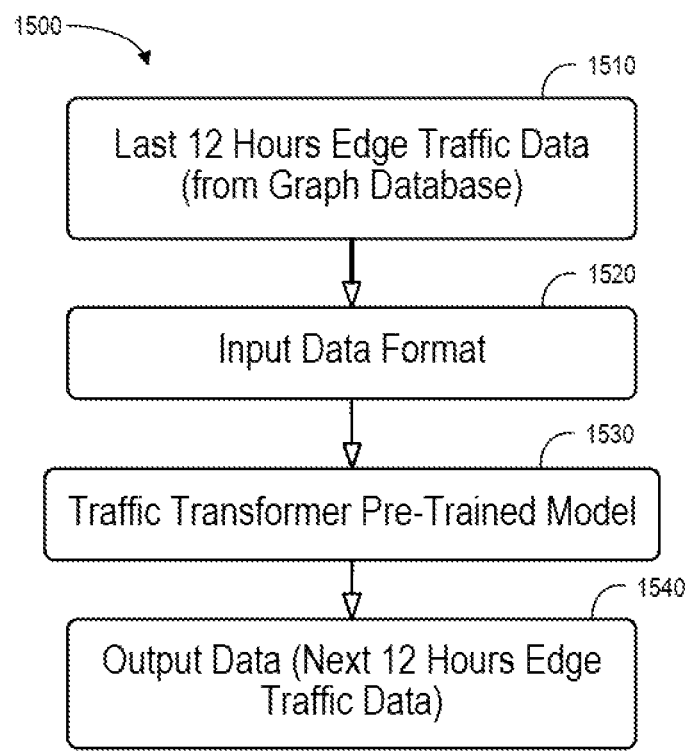
FIG. 15 is a traffic prediction process in accordance with some embodiments.

When the trained model is ready, the system can predict, for example, the next 12 hours of cloud traffic for all edges in the graph (which can be reflected as the calling times of different methods). This may directly benefit cloud load management (which can better balance the loads among different methods and give feedback to a corresponding engineering team maintaining the application code to optimize potential heavy call loads). For example, FIG. 15 is a traffic prediction process 1500 in accordance with some embodiments. Initially, the system loads the last 12 hours of cloud edge traffic data from a graph database 1510. The data can then be transformed into be a training data input data format 1520. The system may also load the binary model which has been pre-trained 1530 (as described in connection with FIG. 14). Using this model, the system output 1540 a prediction for the next 12 hours of cloud edge traffic. The system output 1540 may depend on what the model has learned based on past behavior of the enterprise cloud environment (e.g., including day and night status, weekday and weekend status, holiday and non-holiday status, etc.).

Figure 16:
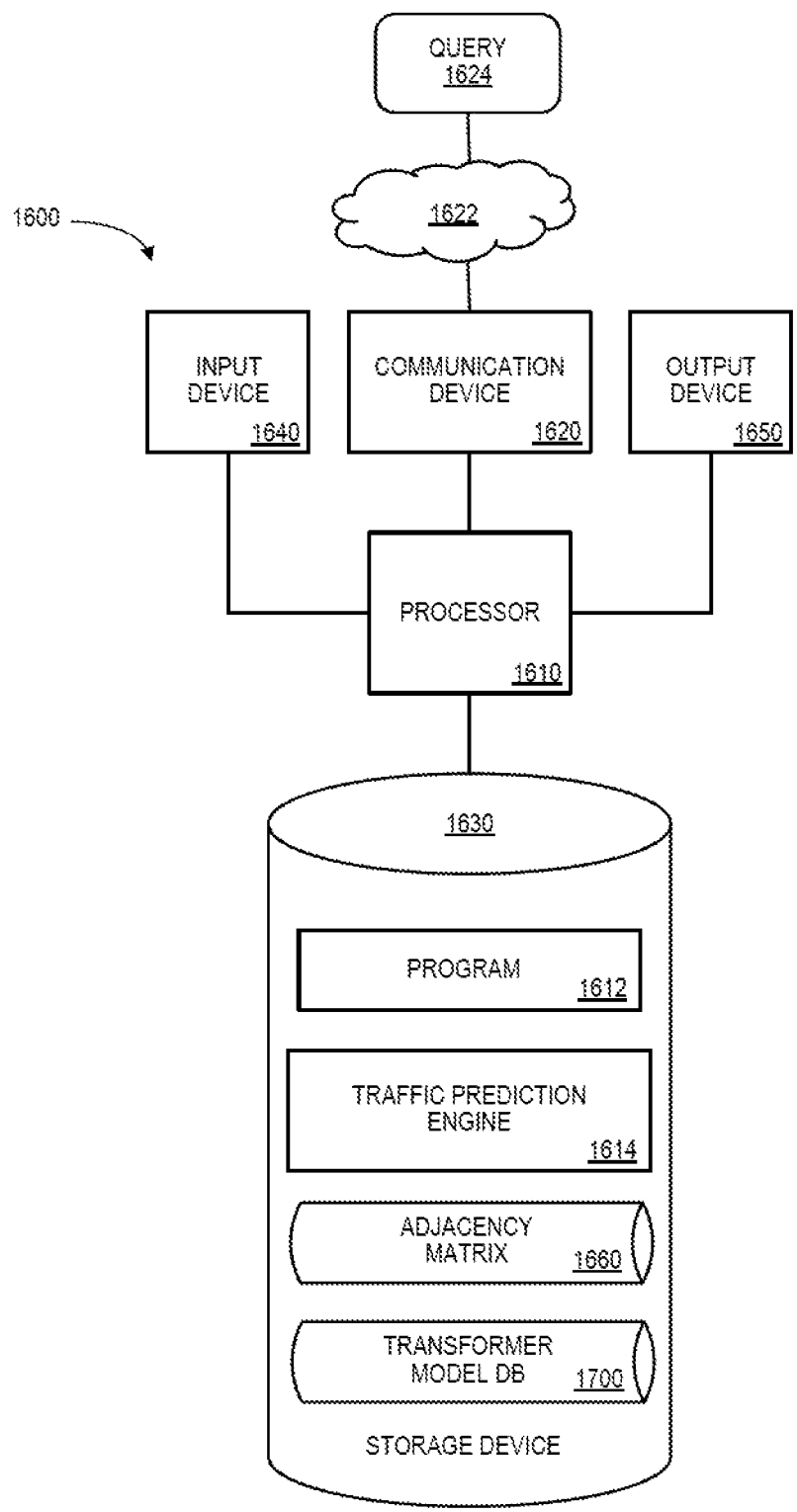
FIG. 16 is an apparatus or platform according to some embodiments.

Note that the embodiments described herein may be implemented using any number of different hardware configurations. For example, FIG. 16 is a block diagram of an apparatus or platform 1600 that may be, for example, associated with the system 100 of FIG. 1 (and/or any other system described herein). The platform 1600 comprises a processor 1610, such as one or more commercially available CPUs in the form of one-chip microprocessors, coupled to a communication device 1620 configured to communicate via a communication network (not shown in FIG. 16). The communication device 1620 may be used to communicate, for example, with one or more remote user platforms or a traffic query generating device 1624 via a communication network 1622. The platform 1600 further includes an input device 1640 (e.g., a computer mouse and/or keyboard to input data about monitored system or data sources) and an output device 1650 (e.g., a computer monitor to render a display, transmit recommendations or alerts (e.g., a traffic alert signal when predicted network traffic exceeds a threshold amount), and/or create monitoring reports). According to some embodiments, a mobile device and/or PC may be used to exchange data with the platform 1600.

The processor 1610 also communicates with a storage device 1630. The storage device 1630 can be implemented as a single database, or the different components of the storage device 1630 can be distributed using multiple databases (that is, different deployment data storage options are possible). The storage device 1630 may comprise any appropriate data storage device, including combinations of magnetic storage devices (e.g., a hard disk drive), optical storage devices, mobile telephones, and/or semiconductor memory devices. The storage device 1630 stores a program 1612 and/or traffic prediction engine 1614 for controlling the processor 1610. The processor 1610 performs instructions of the programs 1612, 1614, and thereby operates in accordance with any of the embodiments described herein. For example, the processor 1610 may retrieve performance stack trace logs from a traffic performance stack trace log repository that stores traffic information of the cloud computing environment. The processor 1610 may parse the performance stack trace logs as an objects list (including parent/child object relationships) and stores the parsed objects list in a graph database. The processor 1610 may then transform the graph database into training data (including spatial and temporal information) and use the transformed training data to train a transformer model. According to some embodiments, the processor 1610 also provides previous traffic input data to the transformer model when generates predicted traffic output data based on the previous traffic input data (e.g., to facilitate cloud load management).

The programs 1612, 1614 may be stored in a compressed, uncompiled and/or encrypted format. The programs 1612, 1614 may furthermore include other program elements, such as an operating system, clipboard application, a database management system, and/or device drivers used by the processor 1610 to interface with peripheral devices.

As used herein, data may be "received" by or "transmitted" to, for example: (i) the platform 1600 from another device; or (ii) a software application or module within the platform 1600 from another software application, module, or any other source.

In some embodiments (such as the one shown in FIG. 16), the storage device 1630 further stores an adjacency matrix 1660 and a transformer model database 1700. An example of a database that may be used in connection with the platform 1600 will now be described in detail with respect to FIG. 17. Note that the database described herein is only one example, and additional and/or different data may be stored therein. Moreover, various databases might be split or combined in accordance with any of the embodiments described herein.

Figure 17:
FIG. 17 illustrates a traffic prediction database in accordance with some embodiments.

Referring to FIG. 17, a table is shown that represents the transformer model database 1700 that may be stored at the platform 1600 according to some embodiments. The table may include, for example, entries identifying in connection with a cloud computing environment. The table may also define fields 1702, 1704, 1706, 1708 for each of the entries. The fields 1702, 1704, 1706, 1708 may, according to some embodiments, specify: a transformer model identifier 1702, training input data 1704, model input data 1706, and a traffic prediction 1708. The transformer model database 1700 may be created and updated, for example, when a new cloud system is modeled, when predictions 1708 are generated, etc.

The transformer model identifier 1702 might be a unique alphanumeric label or link that is associated with a transformer model enhanced by GAT that is used to predict future traffic in a cloud computing environment. The training input data 1704 may comprise a set of vectors (including time data, such as the number of millisecond a procedure is used) and an adjacency matrix created based on graph data reflecting JSON stack trace logs. The model input data 1706 might represent, for example, the last 12 hours of traffic (e.g., HTTP requests) that have been received by a cloud provider. The traffic prediction 1708 might represent the model's prediction about the next 12 hours of traffic that will likely be received.

Figure 18:
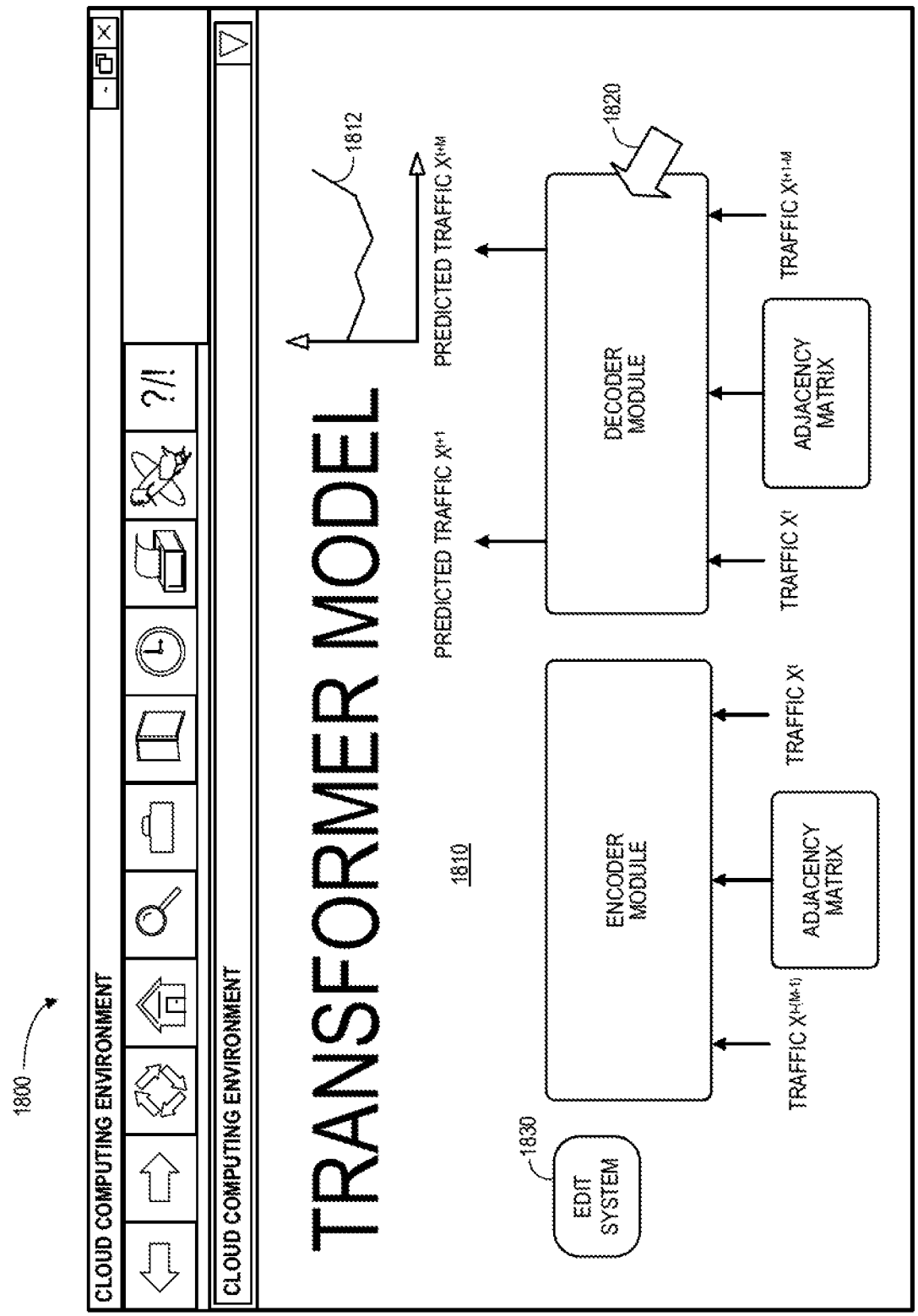
FIG. 18 is a human machine interface display in accordance with some embodiments.

FIG. 18 is a human machine interface display 1800 in accordance with some embodiments. The display 1800 includes a graphical representation 1810 or dashboard that might be used to manage or monitor a transformer model that predicts traffic (e.g., associated with a cloud provider) as shown by a predicted traffic graph 1812. In particular, selection of an element (e.g., via a touchscreen or computer mouse pointer 1820) might result in the display of a popup window that contains configuration data. The display 1800 may also include a user selectable "Edit System" icon 1830 to request system changes (e.g., to investigate or improve system performance).

Thus, embodiments may fully utilize graph attributes to form graph-based data, and (at the same time) preserve time stamp information (that is, the data contains both temporal and spatial information). Embodiments may let a user store and query the data in a graph database (e.g., AP® HANA Graph or Neo4j) which could be very efficient and convenient. Moreover, embodiments may transform performance stack trace data into graph training ready data with time shift (so it can be used for input and output for further training). In addition, embodiments utilize an advanced model that includes GAT and a transformer so as to leverage both temporal and spatial data (and make accurate prediction for the next few hours method call traffic in a cloud).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
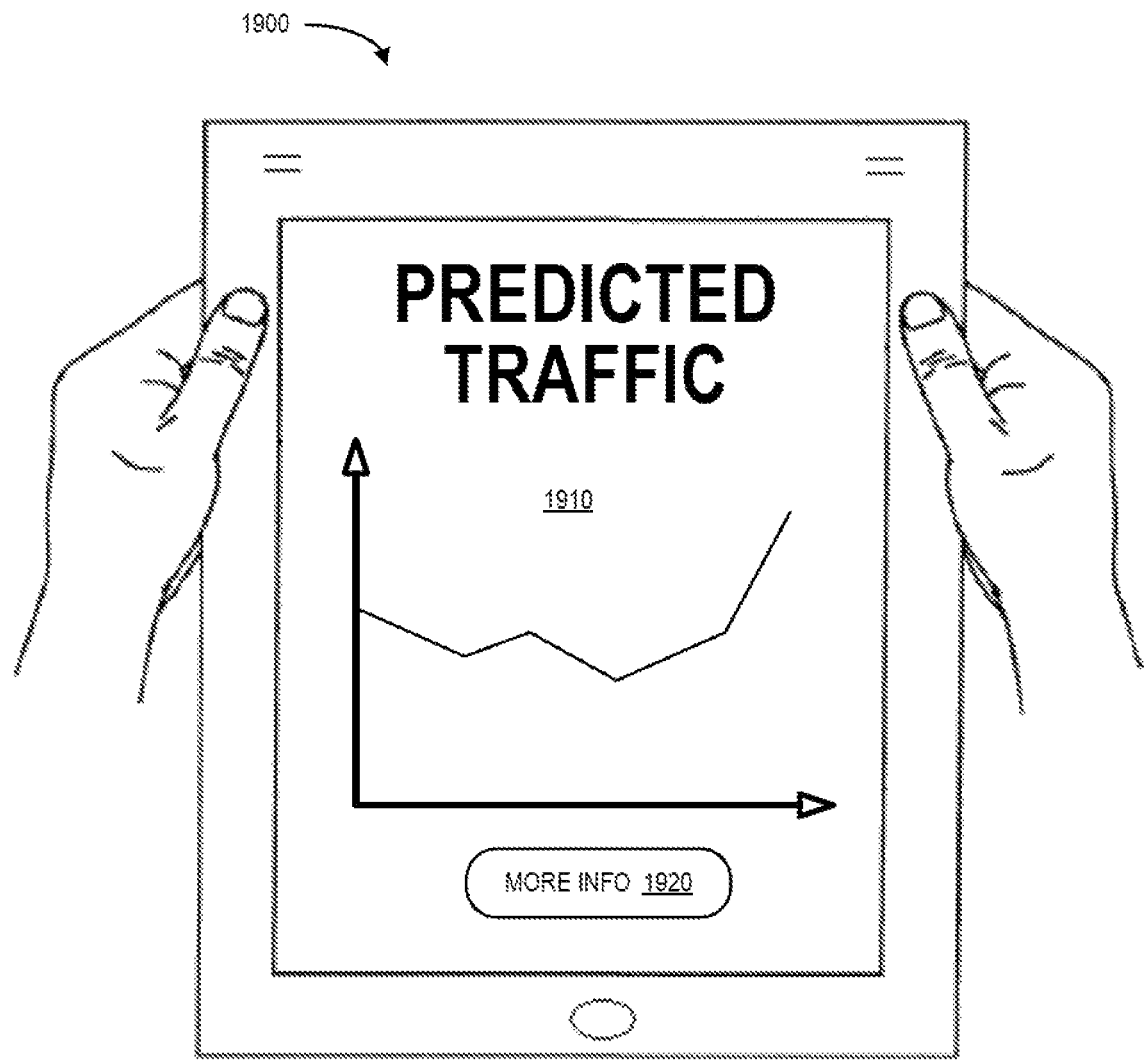
FIG. 19 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of track trace data, any of the embodiments described herein could be applied to other types of stack trace data situations. Moreover, the displays shown herein are provided only as examples, and any other type of user interface could be implemented. For example, FIG. 19 shows a handheld tablet computer 1900 rendering predicted traffic display 1910 that may be used to view or adjust graph spatial information and/or to request additional data (e.g., via a "More Info" icon 1920).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to facilitate traffic prediction for a cloud computing environment, comprising:
    a traffic prediction server, including:
        a computer processor, and
        a memory storage device, coupled to the computer processor, including instructions that, when executed by the computer processor, enable the traffic prediction server to:
            (i) retrieve performance stack trace logs from a traffic performance stack trace log repository,
            (ii) parse the performance stack trace logs as an objects list including parent/child object relationships,
            (iii) store the parsed objects list in a graph database,
            (iv) transform the graph database into training data including spatial and temporal information, and
            (v) use the transformed training data to train a transformer model.

2. The system of claim 1, further comprising:
    a performance stack trace log repository, coupled to the traffic prediction server, storing traffic information of the cloud computing environment.

3. The system of claim 1, wherein the traffic prediction server is further to provide previous traffic input data to the transformer model.

4. The system of claim 3, wherein the transformer model generates predicted traffic output data based on the previous traffic input data.

5. The system of claim 4, wherein the predicted traffic output data is used to perform at least one of: (i) cloud load management by automatically adjusting an amount of allocated computing resources, and (ii) generation of a traffic alert signal.

6. The system of claim 1, wherein the performance stack trace logs represent Hyper-Text Transfer Protocol ("HTTP") requests and include at least one of: (i) a Uniform Resource Location ("URL"), (ii) a time cost, a (iii) a computation resources amount, (iv) a memory resources amount, (v) nested Application Programming Interface ("API") calls, (vi) an API call invocation count, and (vii) an API call invocation duration.

7. The system of claim 6, wherein each performance stack trace log is a JavaScript Object Notation ("JSON") file and includes, for each of a plurality of methods, a method name, an invoke count, and an associated time cost.

8. The system of claim 7, wherein the JSON file includes nested methods.

9. The system of claim 8, wherein the JSON file is parsed, if a sub-method exists, by looping all of the sub-methods.

10. The system of claim 9, wherein, for each sub-method, if further sub-methods exist inside, the system recursively parses those further sub-methods.

11. The system of claim 8, wherein if no method name already exists in a graph relationship for an object being parsed, inserting that method name into the graph relationship.

12. The system of claim 11, wherein the graph relationship is built based on parent/child relationships for each object being parsed.

13. The system of claim 8, wherein the parent child object relationships are stored in an adjacency matrix of the graph database.

14. The system of claim 13, wherein the adjacency matrix is generated by: selecting a first node; determining if a second node has a child relationship to the first node; if the second node has a child relationship to the first node, storing a first value in a corresponding adjacency matrix location; and if the second node does not have a child relationship to the first node, storing a second value in the corresponding adjacency matrix location.

15. The system of claim 1, wherein the transformer model is enhanced by at least one Graph Attention Networks ("GAT") and an encoder-decoder architecture that coherently models spatial and temporal dependencies.

16. The system of claim 10, wherein an output of each GAT is provided to a feed forward neural network.

17. The system of claim 16, wherein a loss function of the transformer model comprises:

$$\text{Loss} = \frac{1}{H}\sum_{t=1}^{H}\frac{1}{N}\sum_{j=1}^{N}\left|X_j^t - \hat{X}_j^t\right|$$

where $X_j^t$ is predicted traffic at edge j during time t, and $\hat{X}_j^t$ is a corresponding ground truth.

18. A computer-implemented method to facilitate traffic prediction for a cloud computing environment, comprising:
    retrieving, by a computer processor of a traffic prediction server, performance stack trace logs from a traffic performance stack trace log repository that stores traffic information of the cloud computing environment;
    parsing the performance stack trace logs as an objects list including parent/child object relationships;
    storing the parsed objects list in a graph database;
    transforming the graph database into training data including spatial and temporal information; and use the transformed training data to train a transformer model;
    using the transformed training data to train a transformer model; and
    providing previous traffic input data to the transformer model, wherein the transformer model generates predicted traffic output data based on the previous traffic input data.

19. The method of claim 18, wherein the parent child object relationships are stored in an adjacency matrix of the graph database.

20. A non-transitory, computer readable medium having executable instructions stored therein to perform a method to facilitate traffic prediction for a cloud computing environment, the method comprising:
- retrieving, by a computer processor of a traffic prediction server, performance stack trace logs from a traffic performance stack trace log repository that stores traffic information of the cloud computing environment;
- parsing the performance stack trace logs as an objects list including parent/child object relationships;
- storing the parsed objects list in a graph database;
- transforming the graph database into training data including spatial and temporal information; and use the transformed training data to train a transformer model; and
- using the transformed training data to train a transformer model.

21. The medium of claim 20, wherein the traffic prediction server is further to provide previous traffic input data to the transformer model and the transformer model generates predicted traffic output data based on the previous traffic input data.

* * * * *